July 11, 1967     S. M. PAMBELLO     3,330,051
AVIATION FLIGHT HOOD
Filed March 3, 1965

INVENTOR
SAMUEL M. PAMBELLO
BY
ATTORNEY

3,330,051
AVIATION FLIGHT HOOD
Samuel Michael Pambello, 316 Bloomfield St., Hoboken, N.J. 07030
Filed Mar. 3, 1965, Ser. No. 436,776
1 Claim. (Cl. 35—12)

The present invention relates to wearing apparel such as an eye shade and, more particularly, to an improved eye shade known as a flight hood which is worn by an aviator to train the aviator to fly by instruments, without relying on seeing the ground or sky, as the aviator would be compelled to do when flying blind in bad weather.

In view of the fact that aviators are likely to encounter bad flying weather in which landmarks and the like are invisible, all civilian aviation students or trainees are required to have a minimum number of hours of instructions under simulated blind flying conditions. This is usually accomplished by having the student wear a flight hood which blocks outside of the aircraft vision but gives the student full view of the instrument panel.

One difficulty with flight hoods presently available is that they are quite elaborate and hence are costly. Since the student is required to wear the hood only for a number of hours of instruction, the cost of the hood is not justified and the practice has been for the student or the school to hand down the hood from one student to another. This practice however, is not santitary because the section of the hood in contact with the forehead of the wearer is soiled by perspiration and is likely to commute skin infections from one student to another or at least cause irritation. Another difficulty is that such hoods are not foldable and cannot be stowed away in the student's flight jacket pocket.

Accordingly, an object of the present invention is to provide an improved flight hood which is extremely simple and economical but fulfills all of the requirements of an acceptable flight hood.

Another object is to provide such a hood which is so inexpensive that the student can afford to purchase the hood and keep the same as a memento after the student has no further use for the hood.

Another object is to provide such a hood which can be folded in a convenient manner to merchandise the hood and to enable the student to stow the hood in a pocket.

A further object is to provide such a hood which can be fabricated by the use of conventional cutting and folding machinery without the need of costly dies or molds.

Other and further objects of the invention will be obvious upon an understanding of the illustrative embodiment about to be described, or will be indicated in the appended claim, and various advantages not referred to herein will occur to one skilled in the art upon employment of the invention in practice.

A preferred embodiment of the invention has been chosen for purposes of illustration and description, and is shown in the accompanying drawing, forming a part of the specification, wherein.

Figure 1:
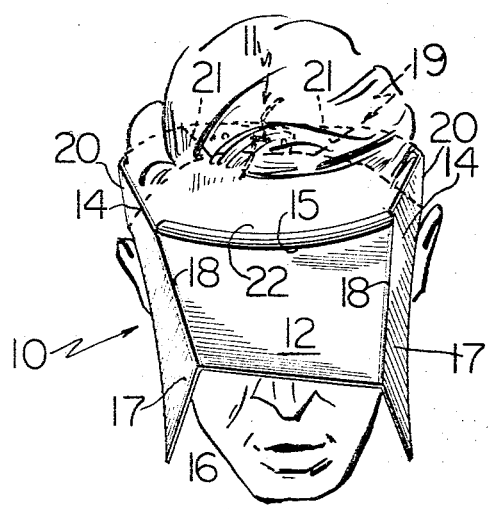
FIG. 1 is a perspective view of a flight hood in accordance with the present invention illustrating the same as worn with the head of the wearer being shown in broken lines.

Referring now to the drawing in detail, there is shown a flight hood which generally comprises a unitary sheet 10 of vinyl or linear polyethylene flat stock having a thickness of about 0.020 inch; and a fastening arrangement 11.

Figure 2:
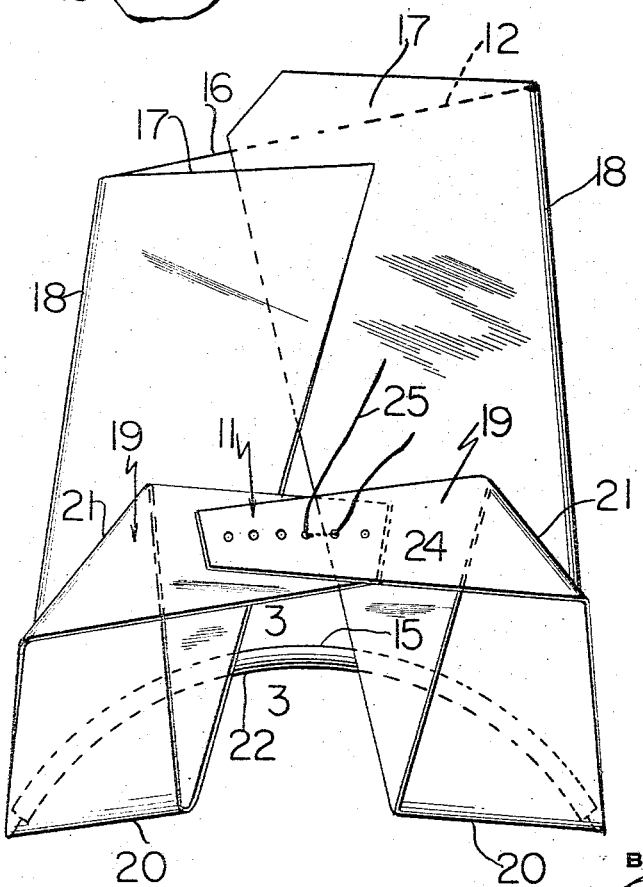
FIG. 2 is a plan view of the hood illustrating the same folded together for packaging or storing.

The sheet 10 has a generally quadrangular top section 12 provided with elongate sides 14 preferably of greater length than the ends 15 and 16 thereof, and formed with a curved edge at the inner end 15 shaped to fit the forehead of the aviator; a depending flap section 17 at each side of the top section 12 and coextensive therewith and foldably connected thereto by a crease or fold 18; and a rearwardly extending strap section 19 foldably connected to the inner end of each flap section by a crease or fold 20 and being of a length to extend partially around the head of the aviator, for example about halfway, each of the strap sections 19 being formed with a crease or fold 21 at about the middle thereof, whereby the sheet can be folded together in a substantially flat and compact condition as shown in FIG. 2 to fit into the aviator's pocket for convenient carrying and stowage when not in use.

Figure 3:
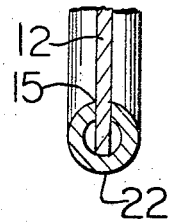
FIG. 3 is a sectional view taken along the line 3—3 on FIG. 2.

The curved inner edge 15 is provided with a smooth bead 22 which contacts the aviator's forehead to establish a comfortable fit. As shown in FIG. 3, the bead 22 may be provided by a U-shaped plastic strip fitting over and under the curved edge portions of the top section. The strip may be secured in any suitable manner, for example by heat sealing, adhesively, or stitching.

As illustrated herein, the outer or forward end edge 16 of the top section 12 is diagonal and extends inwardly from left to right so that the flap section at the right is somewhat shorter than the flap section at the left. This arrangement gives the student more vision towards the right which is desirable because in a dual control training aircraft the student sits in the left seat and the instructor sits in the right seat whereby the student can see the instruments at the right side of the panel as well as those in front of the student without turning of the head.

The fastening arrangement 11 includes a plurality of spaced apertures 24 in the outer or free end portion of the strap sections 19, and a flexible strand 25 formed of plastic. The strand is threaded through one or more of the apertures 24 of each strap section and is tied with a bow or knot (FIG. 2). By providing a plurality or series of apertures, the strap sections can be adjusted to accommodate a wide range of head sizes.

The flight hood shown herein can be fabricated from about a 16 by 16 inch sheet of material, to provide a hood which extends forwardly about six inches at the middle of the top section, has flap sections which extend downwardly about four inches at the outer end thereof, and has a width of about six inches at outer edge of the top section. The hood when folded (FIG. 2) occupies a space of about 7 by 9 inches. This can be accomplished by utilizing conventional cardboard box cutting and foldable machinery, and thus eliminates the necessity of expensive plastic molding dies.

From the foregoing description, it will be seen that the present invention provides an improved flight hood which is simple and economical in construction and is practical and reliable in use.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

I claim:

A flight hood for training an aviator to fly by instruments which hood comprises a unitary sheet of a nontransparent and substantially rigid yet foldable material having a generally quadrangular top section provided with elongate sides of greater length than the width of the top section and formed with a curved edge at the inner end thereof shaped to fit the forehead of the aviator, said sheet having a depending flat section at each side of said top section and being coextensive therewith and foldably connected thereto, and said sheet having a rearwardly extending strap section foldably connected to the inner end of each of said flap sections and being of a length to extend partially around the head of the aviator, each of said strap sections having a fold at about the middle thereof extending diagonally towards the rear from top of bottom, the fold connecting said flat and strap sections being substantially vertical, whereby said sheet can be folded together in substantially compact and flap condition to fit the aviator's pocket, the outer end of said top section being diagonal so that the outer end of one of said flap sections extends outwardly beyond the outer end of said other flap section to provide less side vision at one side of the hood to prevent the aviator from seeing the ground or sky and more side vision at the other side of the hood to enable the aviator to see entire instrument panel; attaching means including a series of spaced apertures arranged in a row in each of said strap sections adjacent the free ends thereof and a flexible strand extending through certain of said apertures in each of said strap sections having free ends adapted to be tied together to attach one strap section to the other; and a bead on said curved edge provided by a generally U-shaped strip secured to said top section at the upper and lower surfaces thereof.

References Cited

UNITED STATES PATENTS

| | | | |
|---|---|---|---|
| 687,536 | 11/1901 | Magoris | 2—109 |
| 1,401,758 | 12/1921 | Carleton | 2—12 |
| 2,679,047 | 5/1954 | Bozzi | 2—12 |
| 2,694,263 | 11/1954 | Francis et al. | 35—12 |
| 2,787,791 | 4/1957 | Liney et al. | 2—12 X |
| 3,184,757 | 5/1965 | Pennington | 2—12 X |
| 3,225,459 | 12/1965 | Wilstein | 2—12 X |

FOREIGN PATENTS

| | | |
|---|---|---|
| 551,553 | 1/1923 | France. |

PATRICK D. LAWSON, *Primary Examiner.*

JORDAN FRANKLIN, *Examiner.*

A. R. GUEST, *Assistant Examiner.*